(12) United States Patent
Lin et al.

(10) Patent No.: US 8,369,066 B2
(45) Date of Patent: Feb. 5, 2013

(54) LAMELLAR STACKED SOLID ELECTROLYTIC CAPACITOR

(75) Inventors: Ching-Feng Lin, Hsinchu County (TW); Yui-Hsin Fran, Hsinchu (TW); Chi-Hao Chiu, Hsinchu (TW); Ming-Tsung Chen, Changhua County (TW); Cheng-Wei Lai, Miaoli County (TW); Chun-Chia Huang, Tainan County (TW)

(73) Assignee: Apaq Technology Co., Ltd., Miaoli County (TW)

( * ) Notice: Subject to any disclaimer, the term of this patent is extended or adjusted under 35 U.S.C. 154(b) by 293 days.

(21) Appl. No.: 12/713,398

(22) Filed: Feb. 26, 2010

(65) Prior Publication Data

US 2011/0007452 A1    Jan. 13, 2011

(30) Foreign Application Priority Data

Jul. 10, 2009 (TW) .............................. 98123413 A

(51) Int. Cl.
*H01G 9/00* (2006.01)
(52) U.S. Cl. ........ 361/523; 361/525; 361/528; 361/529; 361/517; 361/519
(58) Field of Classification Search ................... 361/523, 361/516–519, 525, 528–530, 540–541, 535–536; 29/25.03, 25.05, 25.01
See application file for complete search history.

(56) References Cited

U.S. PATENT DOCUMENTS

| | | | | |
|---|---|---|---|---|
| 7,289,314 B2 * | 10/2007 | Kobayashi et al. | ............ | 361/523 |
| 7,312,979 B2 * | 12/2007 | Ishizuka et al. | ................ | 361/537 |
| 7,575,148 B2 * | 8/2009 | Kubouchi et al. | ........... | 228/112.1 |

* cited by examiner

*Primary Examiner* — Nguyen T Ha
(74) *Attorney, Agent, or Firm* — C. G. Mersereau; Nikolai & Mersereau, P.A.

(57) ABSTRACT

A lamellar stacked solid electrolytic capacitor includes a plurality of capacitor units, a substrate unit and a package unit. Each capacitor unit is composed of a negative foil, an isolation paper with conductive polymer substance, a positive foil, an isolation paper with conductive polymer substance and a negative foil that are stacked onto each other in sequence, the positive foils of the capacitor units are electrically connected to each other, the negative foils of the capacitor units are electrically connected to each other, and the positive foils and the negative foils are insulated from each other. The substrate unit has a positive guiding substrate electrically connected to the positive foils of the capacitor units and a negative guiding substrate electrically connected to the negative foils of the capacitor units. The package unit covers the capacitor units and one part of the substrate unit.

12 Claims, 7 Drawing Sheets

LAMELLAR STACKED SOLID ELECTROLYTIC CAPACITOR

BACKGROUND OF THE INVENTION

1. Field of the Invention

The present invention relates to a stacked solid electrolytic capacitor, in particular, to a lamellar stacked solid electrolytic capacitor.

2. Description of Related Art

Various applications of capacitors include home appliances, computer motherboards and peripherals, power supplies, communication products and automobiles. The capacitors are mainly used to provide filtering, bypassing, rectifying, coupling, blocking or transforming function, which play an important role in the electric and electronic products. There are different capacitors, such as aluminum electrolytic capacitors, tantalum electrolytic capacitors or laminated ceramic capacitors, in different utilization.

A typical aluminum electrolytic capacitor includes an anode foil and a cathode foil processed by surface-enlargement and/or formation treatments. The surface-enlargement treatment is performed by etching a high purity aluminum foil to increase its surface area so that a high capacitor can be obtained to achieve miniaturized electrolytic capacitor. The anode aluminum foil is then subjected to the formation treatment to form a dielectric surface film. A thickness of the dielectric film is related to a supply voltage of the electrolytic capacitor. Normally the cathode foil will be subjected to the formation treatment, too. However, if no formation treatment on the cathode foil, an oxide film layer will be still farmed on the surface when exposed in the air. After cutting to a specific size according to design spec., a laminate made up of the anode foil, the cathode foil which is opposed to the dielectric film of the anode foil and has etched surfaces, and a separator interposed between the anode and cathode foils, is wound to provide an element. The wound element does not have any electric characteristic of the electrolytic capacitor yet until completely dipped in an electrolytic solution for driving and housed in a metallic sheathed package in cylindrical form with a closed-end equipping a releaser. Furthermore, a sealing member made of elastic rubber is inserted into an open-end section of the sheathed package, and the open-end section of the sheathed package is sealed by drawing, whereby an aluminum electrolytic capacitor is constituted.

In fact, the electrolytic capacitor utilizes the mobility of ions in the electrolytic solution to obtain an electric circuit; therefore, the electrical conductivity of the electrolytic solution is an important factor for deciding performance of the electrolytic capacitor. Such that, it is an issue for how to promote the electrical conductivity of the electrolytic solution to maintain the electrolytic capacitor with high-temperature stability on the solution, the aluminum foils, the separator and etc., especially the stability of the solution and the aluminum foils. A typical electrolytic solution for a conventional electrolytic capacitor, especially for those electrolytic capacitors work on a supply voltage under 100V, includes water, organic solvent, organic acid, inorganic acid and some special additives mixed in different proportions.

Moreover, because solid electrolytic capacitor has the advantages of small size, large capacitor and good frequency characteristic, it can be used as a decoupling element in the power circuit of a central processing unit (CPU). In general, a plurality of capacitor elements is stacked together to form a solid electrolytic capacitor with a high capacitor. In addition, the solid electrolytic capacitor of the prior art includes a plurality of capacitor elements and a lead frame. Each capacitor element includes an anode part, a cathode part and an insulating part. The insulating part electrically insulates the anode part and the cathode part from each other. More specifically, the cathode parts of the capacitor elements are stacked over one another. Furthermore, conductive layers are disposed between adjacent capacitor elements so that the capacitor elements are electrically connected to one another.

Furthermore, the winding capacitor includes a capacitor element, a packaging material, and a sealing material. The capacitor element has an anode foil coupled to an anode terminal, a cathode foil coupled to a cathode terminal, a separator, and an electrolyte layer. The anode foil, the cathode foil and the separator are rolled together. The separator is between the anode foil and the cathode foil. The electrolyte layer is formed between the anode foil and the cathode foil. The packaging material has an opening and packages the capacitor element. The sealing material has a through hole where the anode terminal and the cathode terminal pass through and seals the opening of the packaging material. A given space is provided between the sealing material and the capacitor element. A stopper for securing the space is provided on at least one of the anode terminal and the cathode terminal.

SUMMARY OF THE INVENTION

In view of the aforementioned issues, the present invention provides a lamellar stacked solid electrolytic capacitor. The lamellar stacked solid electrolytic capacitor of the present invention has the following advantages:

1. Large area, large capacity, low profile and low cost.
2. The LC (Leakage Current) and the phenomenon of the short circuit are decreased.
3. The soldering difficulty and the ESR (Equivalent Series Resistance) are decreased.

To achieve the above-mentioned objectives, the present invention provides a lamellar stacked solid electrolytic capacitor, including: a plurality of capacitor units, a substrate unit and a package unit. Each capacitor unit is composed of a negative foil, an isolation paper with conductive polymer substance, a positive foil, an isolation paper with conductive polymer substance and a negative foil that are stacked onto each other in sequence, the positive foils of the capacitor units are electrically connected to each other, the negative foils of the capacitor units are electrically connected to each other, and the positive foils and the negative foils are insulated from each other. The substrate unit has a positive guiding substrate electrically connected to the positive foils of the capacitor units and a negative guiding substrate electrically connected to the negative foils of the capacitor units. The package unit covers the capacitor units and one part of the substrate unit.

To achieve the above-mentioned objectives, the present invention provides a lamellar stacked solid electrolytic capacitor, including: a capacitor unit, a substrate unit and a package unit. The capacitor unit is composed of a plurality of negative foils, a plurality of isolation paper with conductive polymer substance and a plurality of positive foils that are alternatively stacked onto each other. Each isolation paper is disposed between each positive foil and each negative foil, the positive foils are electrically connected to each other, the negative foils are electrically connected to each other, and the positive foils and the negative foils are insulated from each other. The substrate unit has a positive guiding substrate electrically connected to the positive foils of the capacitor unit and a negative guiding substrate electrically connected to the negative foils of the capacitor unit. The package unit covers the capacitor units and one part of the substrate unit.

Therefore, the present invention has the following advantages:

1. The negative foil, the isolation paper with conductive polymer substance, the positive foil, the isolation paper with conductive polymer substance and the negative foil are stacked onto each other in sequence to form one capacitor unit, and many capacitor units are electrically stacked onto each other; alternatively, the negative foil, the isolation paper with conductive polymer substance, the positive foil, the isolation paper with conductive polymer substance, the negative foil, the isolation paper with conductive polymer substance, the positive foil, the isolation paper with conductive polymer substance, the negative foil, . . . etc. are stacked onto each other in sequence to form one capacitor unit, in order to generate the advantages, as follows: large area, large capacity, low profile and low cost.

2. The carbon glue layer and silver glue layer of the aluminum stacked solid electrolytic capacitor is replaced by the negative foil (negative electrode) of the present invention. In addition, the edge of the positive foil and the edge of the negative foil are covered with the resin body, and the insulating layer is disposed around one part of a top, a bottom, a left and a right surfaces of each positive foil, in order to decrease the LC (Leakage Current) and the phenomenon of the short circuit.

3. The positive pins are extended from the positive foils of the capacitor units along the same direction and/or different directions and are electrically stacked onto each other by soldering, so that the soldering difficulty and the ESR (Equivalent Series Resistance) are decreased.

In order to further understand the techniques, means and effects the present invention takes for achieving the prescribed objectives, the following detailed descriptions and appended drawings are hereby referred, such that, through which, the purposes, features and aspects of the present invention can be thoroughly and concretely appreciated; however, the appended drawings are merely provided for reference and illustration, without any intention to be used for limiting the present invention.

DETAILED DESCRIPTION OF THE PREFERRED EMBODIMENTS

Figure 1:
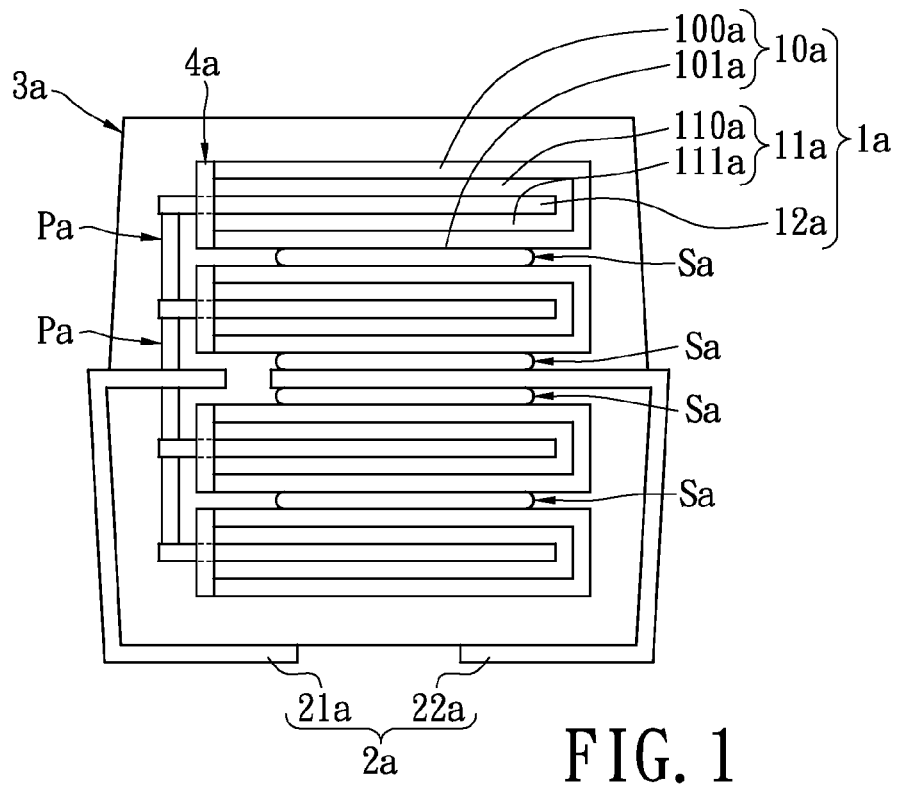
FIG. 1 is a lateral, schematic view of the lamellar stacked solid electrolytic capacitor according to the first embodiment of the present invention.

Referring to FIG. 1, the first embodiment of the present invention provides a lamellar stacked solid electrolytic capacitor with positive multi-pin structure, including: a plurality of capacitor units 1a, a substrate unit 2a and a package unit 3a. Every two capacitor units 1a are electrically stacked onto each other by a conductive layer Sa such as silver glue or silver paste.

Each capacitor unit 1a is composed of a negative foil (negative electrode) 100a, an isolation paper 110a with conductive polymer substance, a positive foil (positive electrode) 12a, an isolation paper 111a with conductive polymer substance and a negative foil (negative electrode) 101a that are alternatively stacked onto each other. Each positive foil 12a has an oxide layer (not shown) on its outer surface, and the oxide layer can be a dielectric layer to generate insulation effect. The two isolation paper (110a, 101a) of each capacitor unit 1a are integrated to form a U-shaped isolation paper 11a in order to cover one part of the positive foils 12a of each capacitor unit 1a, and the two negative foils (100a, 101a) of each capacitor unit 1a are integrated to form a U-shaped negative foil 10a in order to cover the U-shaped isolation paper 11a of each capacitor unit 1a.

Moreover, the positive foils 12a of the capacitor units 1a are electrically connected to each other by soldering Pa. The two negative foils (100a, 101a) of each capacitor unit 1a are electrically connected to each other, and the positive foils 12a and the two negative foils (100a, 101a) are insulated from each other. In addition, each capacitor unit 1a has a plurality of insulating layers 4a, and each insulating layer 4a is disposed around one part of an external surface of each positive foil 12a in order to limit the lengths of the negative foils (100a, 101a) and the isolation paper (110a, 111a). In other words, each insulating layer 4a is disposed around one part of a top, a bottom, a left and a right surfaces of each positive foil 12a. Each insulating layer 4a can be an insulating line between the positive electrode and the negative electrode of the each capacitor unit 1a.

Furthermore, the substrate unit 2a has a positive guiding substrate 21a electrically connected to the positive foils 12a of the capacitor units 1a and a negative guiding substrate 22a electrically connected to the negative foils (100a, 101a) of the capacitor units 1a. The substrate unit 2a can be disposed a center position (as shown in FIG. 1), a bottom position or any position of the capacitor units 1a. In addition, the package unit 3a covers the capacitor units 1a and one part of the substrate unit 2a. In other words, one part of the positive guiding substrate 21a and one part of the negative guiding substrate 22a are exposed and bent downwards to form two conductive pins.

Figure 2:
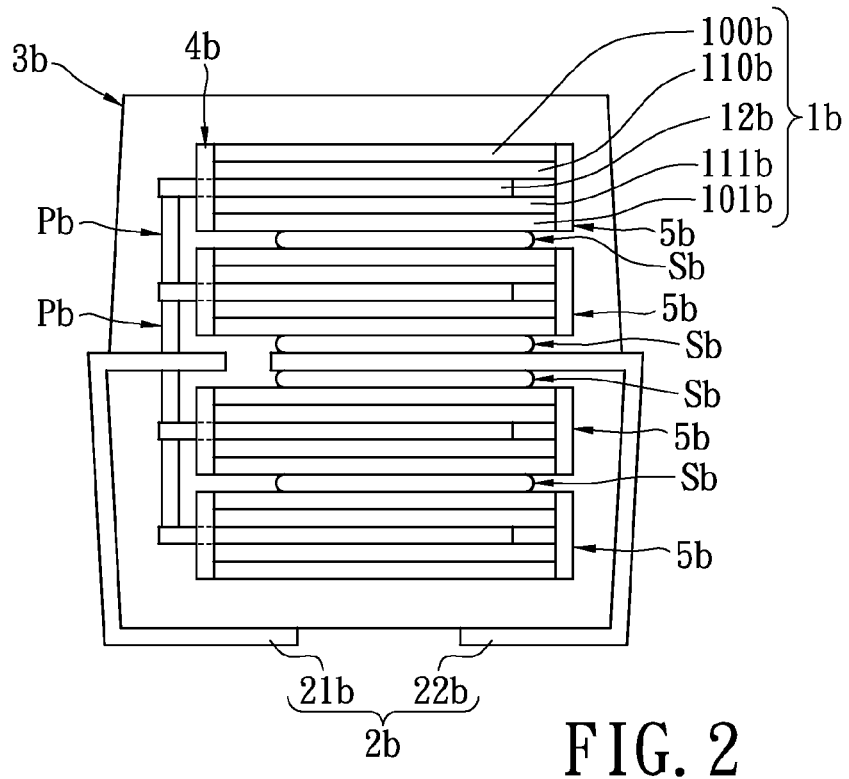
FIG. 2 is a lateral, schematic view of the lamellar stacked solid electrolytic capacitor according to the second embodiment of the present invention.

Referring to FIG. 2, the second embodiment of the present invention provides a lamellar stacked solid electrolytic capacitor with positive multi-pin structure, including: a plurality of capacitor units 1b, a substrate unit 2b and a package unit 3b. Every two capacitor units 1b are electrically stacked onto each other by a conductive layer Sb such as silver glue or silver paste.

Each capacitor unit 1b is composed of a negative foils (negative electrodes) 100b, an isolation paper 110b with conductive polymer substance, a positive foils (positive electrodes) 12b, an isolation paper 111b with conductive polymer substance and a negative foils (negative electrodes) 101b that are stacked onto each other. Each positive foil 12b has an oxide layer (not shown) on its outer surface, and the oxide layer can be a dielectric layer to generate insulation effect. In addition, the second embodiment further includes a plurality of conductive layers 5b. Each conductive layer 5b is electrically connected between the two negative foils (100b, 101b) of each capacitor unit 1b, and the lengths of two same ends of two negative foils (100b, 101b) of each capacitor unit 1b are larger than the length of one end of the positive foil 12b of each capacitor unit 1b in order to prevent the positive foils 12b touching the conductive layers 5b.

Moreover, the positive foils 12b of the capacitor units 1b are electrically connected to each other by soldering Pb. The two negative foils (100b, 101b) of each capacitor unit 1b are electrically connected to each other by the conductive layers 5b, and the positive foils 12b and the two negative foils (100b, 101b) are insulated from each other. In addition, each capacitor unit 1b has a plurality of insulating layers 4b, and each insulating layer 4b is disposed around one part of an external surface of each positive foil 12b in order to limit the lengths of the negative foils (100b, 101b) and the isolation paper (110b, 111b). In other words, each insulating layer 4b is disposed around one part of a top, a bottom, a left and a right surfaces of each positive foil 12b. Each insulating layer 4b can be an insulating line between the positive electrode and the negative electrode of the each capacitor unit 1b.

Furthermore, the substrate unit 2b has a positive guiding substrate 21b electrically connected to the positive foils 12b of the capacitor units 1b and a negative guiding substrate 22b electrically connected to the negative foils (100b, 101b) of the capacitor units 1b. In addition, the package unit 3b covers the capacitor units 1b and one part of the substrate unit 2b.

Figure 3:
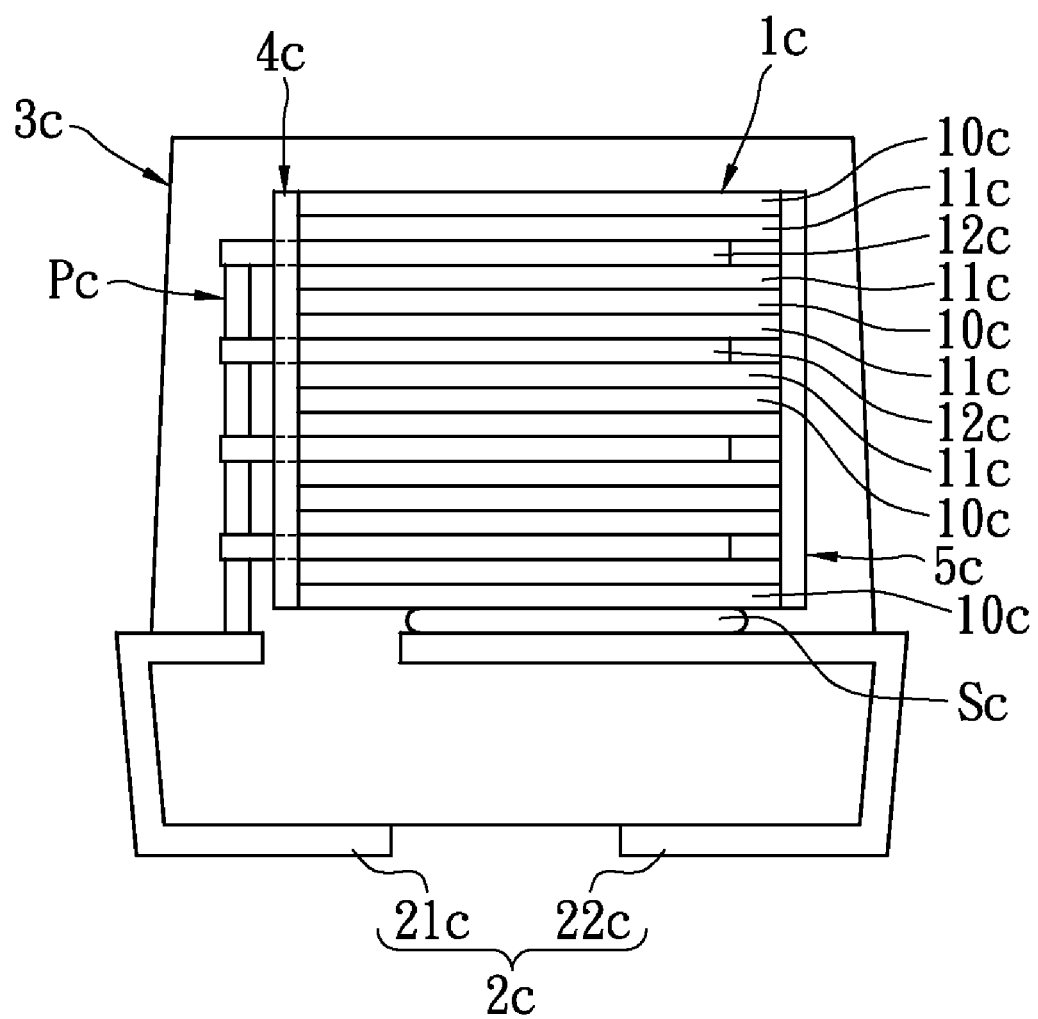
FIG. 3 is a lateral, schematic view of the lamellar stacked solid electrolytic capacitor according to the third embodiment of the present invention.
Figure 4A:
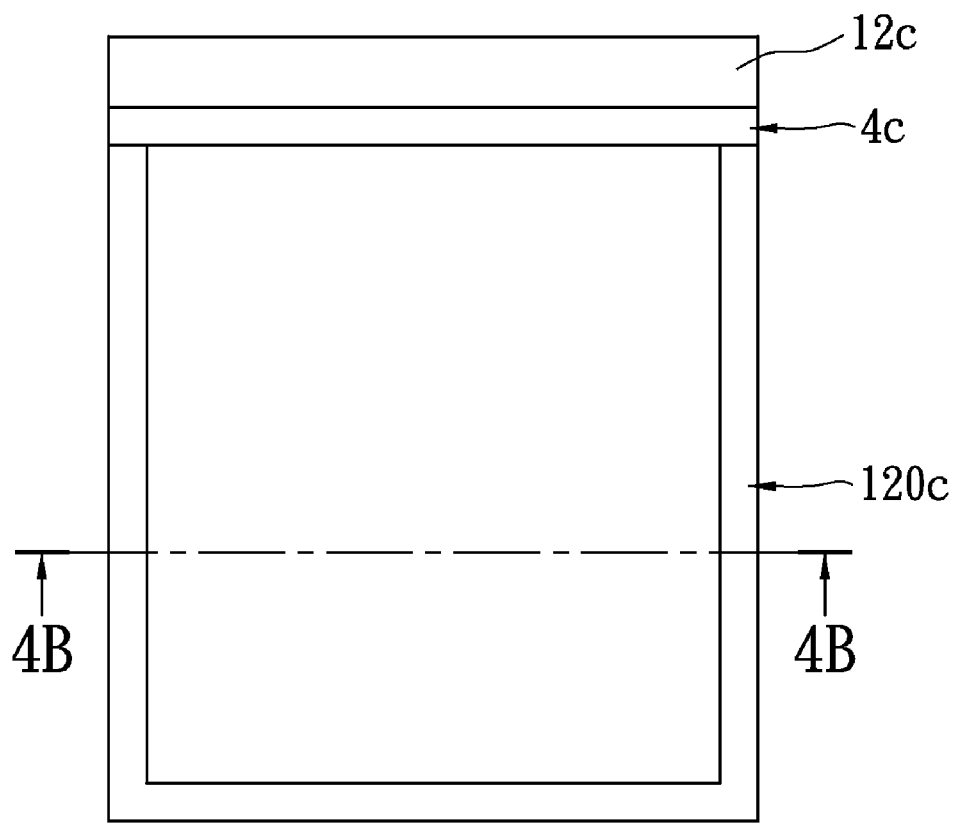
FIG. 4A is a top, schematic view of the resin body installed on an edge of the positive foil according to the third embodiment of the present invention.
Figure 4B:
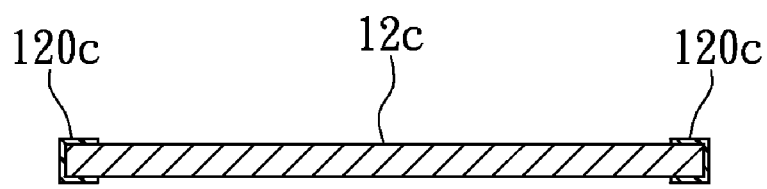
FIG. 4B is an exploded, schematic view along line 4B-4B of FIG. 4A.

Referring to FIGS. 3, 4A and 4B, the third embodiment of the present invention provides a lamellar stacked solid electrolytic capacitor with positive multi-pin structure, including: a capacitor unit 1c, a substrate unit 2c and a package unit 3c.

The capacitor unit 1c is composed of a plurality of negative foils (negative electrodes) 10c, a plurality of isolation paper 11c with conductive polymer substance and a plurality of positive foils (positive electrodes) 12c that are alternatively stacked onto each other. Each isolation paper 11c is disposed between each positive foil 12c and each negative foil 10c. The positive sides of the positive foils 12c are electrically connected to each other by soldering Pc, the negative foils 10c are electrically connected to each other by a conductive layer 5c, and the positive foils 12c and the negative foils 10c are insulated from each other. In addition, each positive foil 12c has a resin body 120c (as shown in FIGS. 4A and 4B) selectively installed on an edge thereof, and each negative foil 10c also has a resin body (not shown) selectively installed on an edge thereof, in order to decrease the LC (Leakage Current) and the phenomenon of the short circuit. Of course, the resin body can be selectively installed on an edge of each positive foil and each negative foil in the other embodiments of the present invention.

Furthermore, the substrate unit 2c has a positive guiding substrate 21c electrically connected to the positive foils 12c and a negative guiding substrate 22c electrically connected to the negative foils 10c by the conductive layer Sc. In addition, the package unit 3c covers the capacitor units 1c and one part of the substrate unit 2c.

In addition, each capacitor unit 1c has a plurality of insulating layers 4c, and each insulating layer 4c is disposed around one part of an external surface of each positive foil 12c in order to limit the lengths of the negative foils 10c and the isolation paper 11c. In other words, each insulating layer 4c is disposed around one part of a top, a bottom, a left and a right surfaces of each positive foil 12c. Each insulating layer 4c can be an insulating line between the positive electrode and the negative electrode of the each capacitor unit 1c. Moreover, the conductive layer 5c is electrically connected one end of the negative foils 10c, and the length of the end of each negative foil 10c is larger than the length of one end of each positive foil 12c in order to prevent the positive foils 12c touching the conductive layer 5c.

Figure 5:
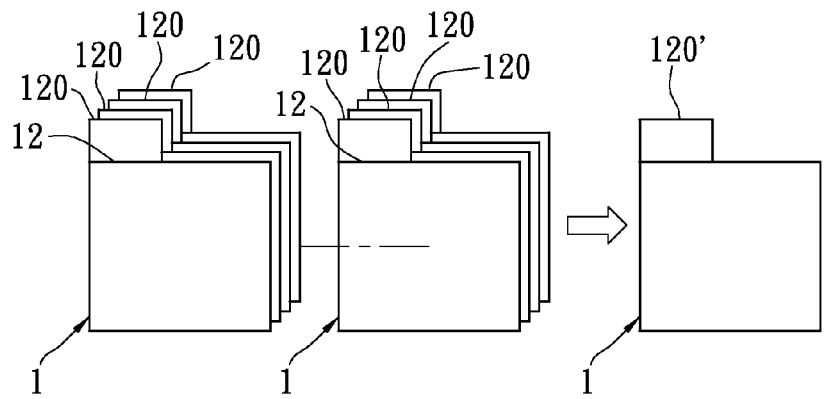
FIG. 5 is a schematic view of the lamellar stacked solid electrolytic capacitor using a first stack method according to the present invention.

The above-mentioned three embodiments can use the following different aspects:

Referring to FIG. 5 (one positive extending side and one negative extending side), the positive foil 12 of each capacitor unit 1 has a positive pin 120 extended outwards therefrom. The positive pins 120 are electrically stacked onto each other to form a positive pin units 120'. The positive pins 120 are respectively extended outwards from the positive foils 12 along the same direction. In addition, the negative foils (not shown) are electrically stacked onto each other by the conductive layers (as shown in FIGS. 1-3).

Figure 6:
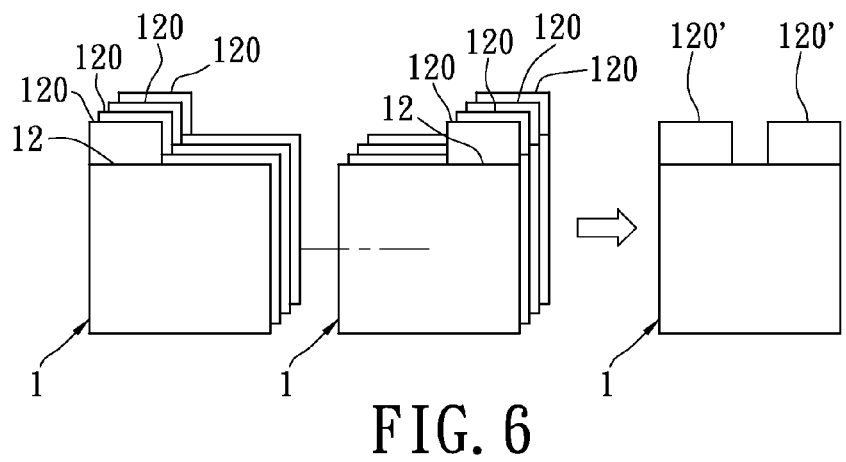
FIG. 6 is a schematic view of the lamellar stacked solid electrolytic capacitor using a second stack method according to the present invention.
Figure 7:
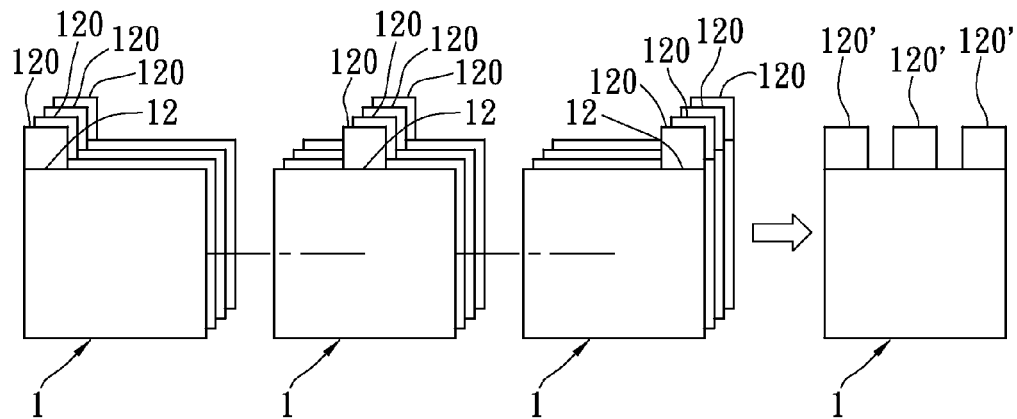
FIG. 7 is a schematic view of the lamellar stacked solid electrolytic capacitor using a third stack method according to the present invention.

Referring to FIGS. 6 and 7 (multi positive extending sides along the same direction and one negative extending side), the positive foil 12 of each capacitor unit 1 has a positive pin 120 extended outwards therefrom. The positive pins 120 of the capacitor units 1 are divided into a plurality of positive pin units 120' that are separated from each other (FIG. 6 discloses two sets of positive pin units 120', FIG. 7 discloses three sets of positive pin units 120'), and the positive pins 120 of each positive pin unit 120' are electrically stacked onto each other. The positive pins 120 are respectively extended outwards from the positive foils 12 along the same direction. Only four layers of soldering can achieve eight layers of stacking as showing in FIG. 6, and only four layers of soldering can achieve twelve layers of stacking as showing in FIG. 7. In addition, the negative foils (not shown) of the capacitor units 1 are electrically stacked onto each other by the conductive layers (as shown in FIGS. 1-3).

Figure 8:
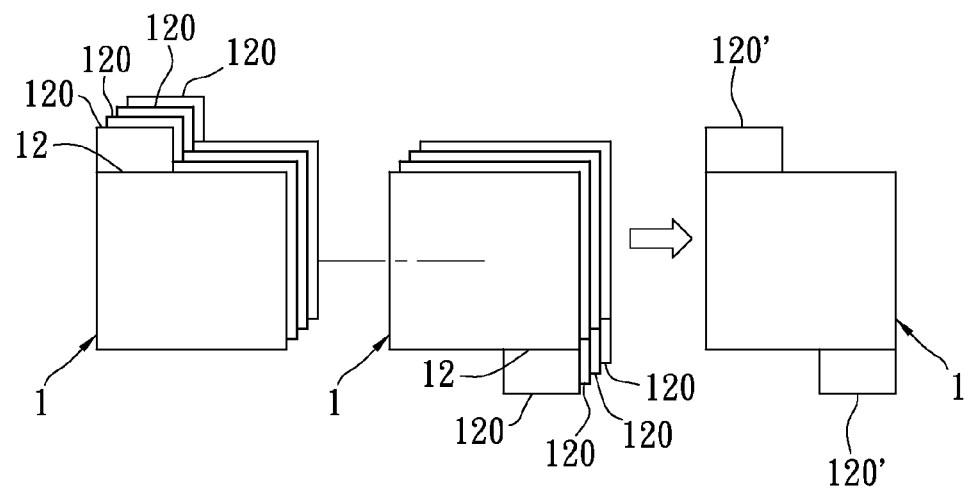
FIG. 8 is a schematic view of the lamellar stacked solid electrolytic capacitor using a fourth stack method according to the present invention.
Figure 9:
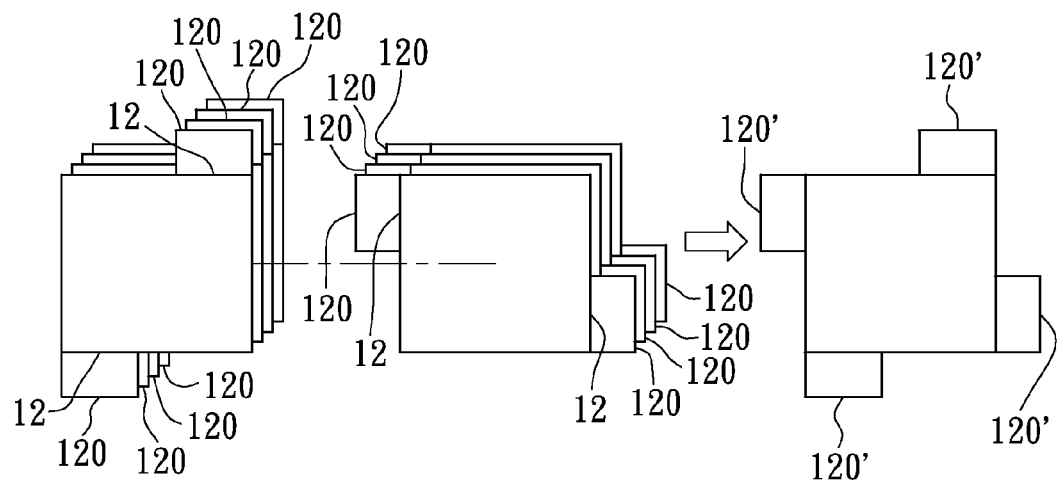
FIG. 9 is a schematic view of the lamellar stacked solid electrolytic capacitor using a fifth stack method according to the present invention.

Referring to FIGS. 8 and 9 (multi positive extending sides along different directions and one negative extending side), the positive foil 12 of each capacitor unit 1 has a positive pin 120 extended outwards therefrom. The positive pins 120 of the capacitor units 1 are divided into a plurality of positive pin units 120' that are separated from each other (FIG. 8 discloses two sets of positive pin units 120', FIG. 9 discloses four sets of positive pin units 120'), and the positive pins 120 of each positive pin unit 120' are electrically stacked onto each other. The positive pins 120 are respectively extended outwards from the positive foils 12 along different directions. In addition, the negative foils (not shown) of the capacitor units 1 are electrically stacked onto each other by the conductive layers (as shown in FIGS. 1-3).

In other words, referring to FIGS. 6-9, the positive foil 12 of each capacitor unit has a positive pin 120 extended outwards therefrom. The positive pins 120 of the capacitor units 1 are divided into a plurality of positive pin units 120' that are separated from each other, and the positive pins 120 of each positive pin unit 120' are electrically stacked onto each other. In addition, the negative foil (not shown) of each capacitor unit 1 has a negative pin (not shown) extended outwards therefrom, and the negative pins of the capacitor units 1 are combined to form a negative pin unit in order to make the negative pins electrically stacked onto each other. Moreover, the positive pins 120 are selectively respectively extended outwards from the positive foils 12 along the same direction (as shown in FIGS. 6-7) or different directions (as shown in FIGS. 8-9), and the negative pins are respectively extended outwards from the negative foils along the same direction (it means that the whole negative pins of the negative foils are electrically stacked onto each other).

Of course, the positive foils can be electrically stacked onto each other and the negative pins (not shown) can be selectively respectively extended outwards from the negative foils along the same direction (to form one positive extending side and multi negative extending sides along the same direction) or different directions (to form one positive extending side and multi negative extending sides along different directions). For example, the positive foils of each capacitor unit has a positive pin extended outwards therefrom, and the positive pins are combined to form a positive pin unit in order to make the positive pins electrically stacked onto each other. The negative foil of each capacitor unit has a negative pin extended outwards therefrom. The negative pins of the capacitor units are divided into the negative pin units, and the negative pin units are separated from each other and the negative pins of each negative pin unit are electrically stacked onto each other. In addition, the positive pins are respectively extended outwards from the positive foils along the same direction, and the negative pins are selectively respectively extended outwards from the negative foils along the same direction or different directions.

Figure 10:
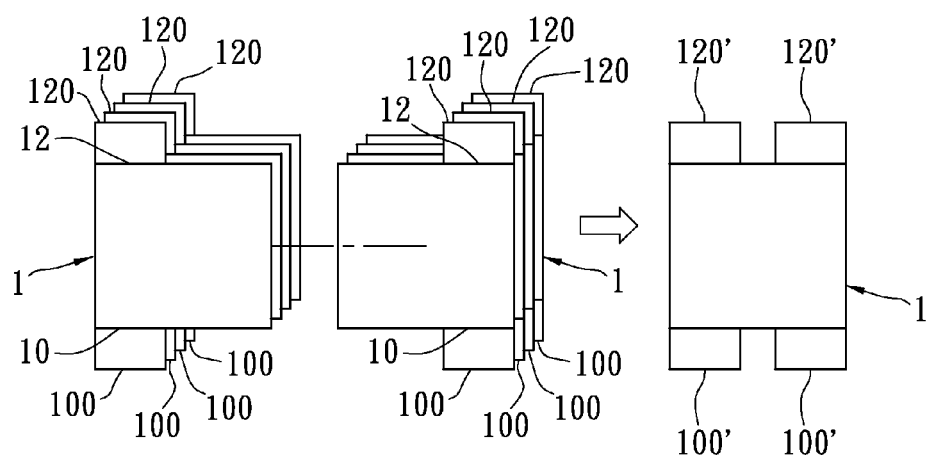
FIG. 10 is a schematic view of the lamellar stacked solid electrolytic capacitor using a sixth stack method according to the present invention.
Figure 11:
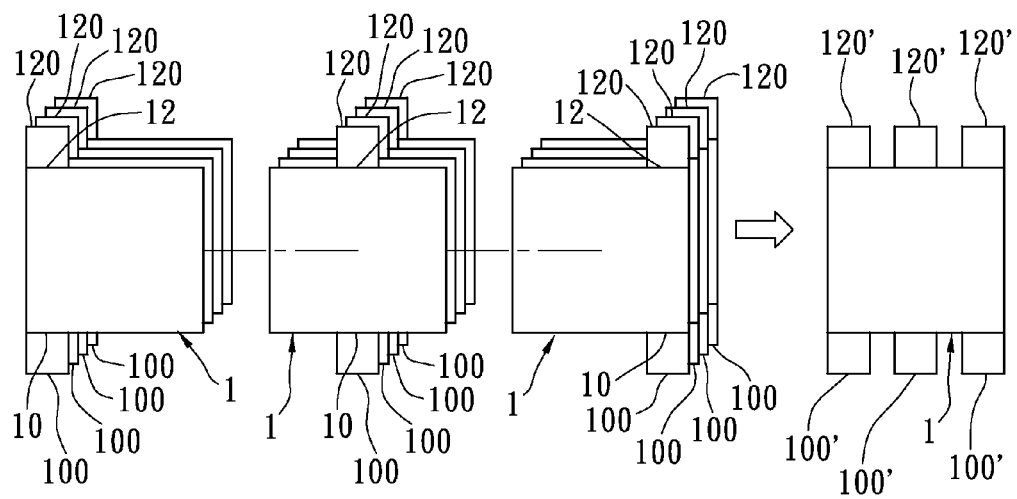
FIG. 11 is a schematic view of the lamellar stacked solid electrolytic capacitor using a seventh stack method according to the present invention.

Referring to FIGS. 10 and 11 (multi positive extending sides along the same direction and multi negative extending sides along the same direction), the positive foil 12 of each capacitor unit 1 has a positive pin 120 extended outwards therefrom. The positive pins 120 of the capacitor units 1 are divided into a plurality of positive pin units 120' that are separated from each other (FIG. 10 discloses two sets of positive pin units 120', FIG. 11 discloses three sets of positive pin units 120'), and the positive pins 120 of each positive pin unit 120' are electrically stacked onto each other. The negative foil 10 of each capacitor unit 1 has a negative pin 100 extended outwards therefrom. The negative pins 100 of the capacitor units 1 are divided into a plurality of negative pin units 100' that are separated from each other (FIG. 10 discloses two sets of negative pin units 100', FIG. 11 discloses three sets of negative pin units 100'), and the negative pins 100 of each negative pin unit 100' are electrically stacked onto each other. The positive pins 120 are respectively extended outwards from the positive foils 12 along the same direction, and the negative pins 100 are respectively extended outwards from the negative foils 10 along the same direction. Only four layers of soldering can achieve eight layers of stacking as shown in FIG. 10, and only four layers of soldering can achieve twelve layers of stacking as shown in FIG. 11. Of course, the aspect of FIGS. 10 and 11 can be changed into multi positive extending sides along different directions and multi negative extending sides along different directions.

For example, the positive foil 12 of each capacitor unit 1 has a positive pin 120 extended outwards therefrom. The positive pins 120 of the capacitor units 1 are divided into a plurality of positive pin units 120' that are separated from each other, and the positive pins 120 of each positive pin unit 120' are electrically stacked onto each other. The negative foil 10 of each capacitor unit 1 has a negative pin 100 extended outwards therefrom. The negative pins 100 of the capacitor units 1 are divided into a plurality of negative pin units 100' that are separated from each other, and the negative pins 100 of each negative pin unit 100' are electrically stacked onto each other. The positive pins 120 are respectively extended outwards from the positive foils 12 along the same direction (as shown in FIGS. 10 and 11) or the different directions, and the negative pins 100 are respectively extended outwards from the same direction (as shown in FIGS. 10 and 11) or the negative foils 10 along different directions.

Therefore, the present invention provides many separate positive pins and/or many separate negative pins. In other words, the present invention can use the separate positive pins and the separate negative pins to execute soldering process (as shown in FIGS. 10 and 11). The present invention also can use the separate positive pins (as shown in FIGS. 6-9) to mate with concentrated negative pins or use the separate negative pins to mate with concentrated positive pins.

Figure 12:
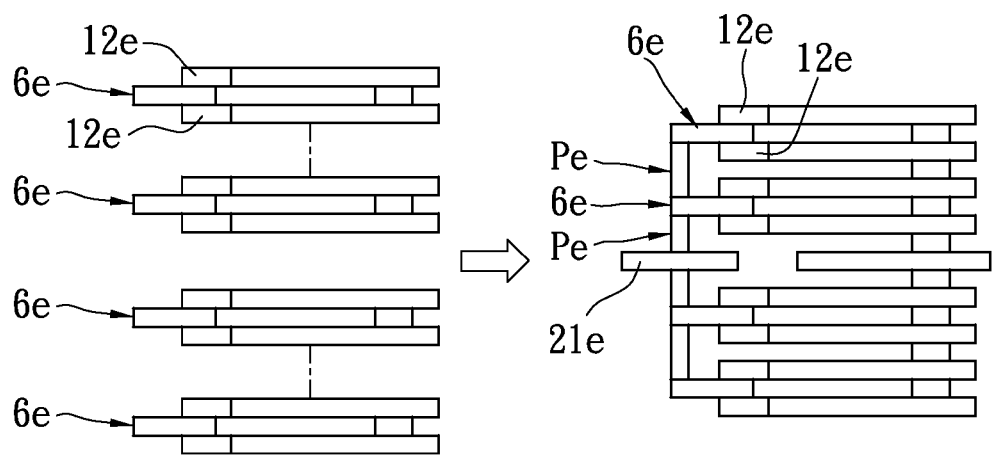
FIG. 12 is a lateral, schematic view of the lamellar stacked solid electrolytic capacitor according to the fourth embodiment of the present invention.

Referring to FIG. 12, the fourth embodiment of the present invention provides a plurality of assistance conductive blocks 6e. Each assistance conductive block 6e is electrically disposed between the two positive foils 12e of every two capacitor units 1e and extended outwards, and the assistance conductive blocks 6e are electrically connected to the positive guiding substrate 21e by soldering Pe. For example, the positive foils 12e are electrically connected to the positive guiding substrate 21e (as shown in FIGS. 1-3) in series by the assistance conductive blocks 6e.

Figure 13:
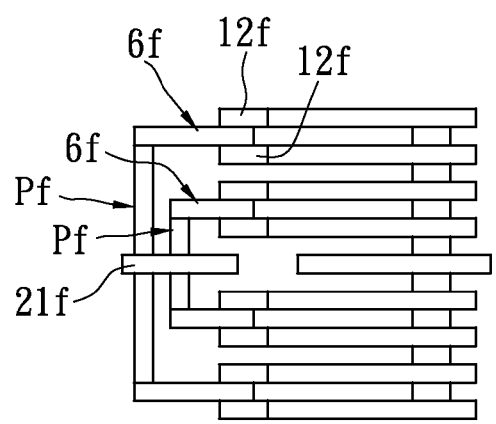
FIG. 13 is a lateral, schematic view of the lamellar stacked solid electrolytic capacitor according to the fifth embodiment of the present invention.

Referring to FIG. 13, the fifth embodiment of the present invention provides a plurality of assistance conductive blocks 6f. Each assistance conductive block 6f is electrically disposed between the two positive foils 12f of every two capacitor units 1f and extended outwards, and the assistance conductive blocks 6f are electrically connected to the positive guiding substrate 21f by soldering Pf. For example, the positive foils 12f are electrically connected to the positive guiding substrate 21f (as shown in FIGS. 5-7) in parallel by the assistance conductive blocks 6f.

In conclusion, the present invention has the following advantages:

1. The negative foil, the isolation paper with conductive polymer substance, the positive foil, the isolation paper with conductive polymer substance and the negative foil are stacked onto each other in sequence to form one capacitor unit, and many capacitor units are electrically stacked onto each other; alternatively, the negative foil, the isolation paper with conductive polymer substance, the positive foil, the isolation paper with conductive polymer substance, the negative foil, the isolation paper with conductive polymer substance, the positive foil, the isolation paper with conductive polymer substance, the negative foil, . . . etc. are stacked onto each other in sequence to form one capacitor unit, in order to generate the advantages, as follows: large area, large capacity, low profile and low cost.

2. The carbon glue layer and silver glue layer of the aluminum stacked solid electrolytic capacitor is replaced by the negative foil (negative electrode) of the present invention. In addition, the edge of the positive foil and the edge of the negative foil are covered with the resin body, and the insulating layer is disposed around one part of a top, a bottom, a left and a right surfaces of each positive foil, in order to decrease the LC (Leakage Current) and the phenomenon of the short circuit.

3. The positive pins are extended from the positive foils of the capacitor units along the same direction and/or different directions and are electrically stacked onto each other by soldering, so that the soldering difficulty and the ESR (Equivalent Series Resistance) are decreased.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A lamellar stacked solid electrolytic capacitor, comprising:
   a capacitor unit composed of a plurality of negative foils, a plurality of isolation papers with conductive polymer substance and a plurality of positive foils that are alternatively stacked onto each other, wherein each isolation paper is disposed between each positive foil and each negative foil, the positive foils are electrically connected to each other, the negative foils are electrically connected to each other, and the positive foils and the negative foils are insulated from each other;
   a conductive layer electrically connected to one end of each negative foil, and the length of the end of each negative foil is larger than the length of one end of each positive foil in order to prevent the positive foils touching the conductive layer;
   a substrate unit having a positive guiding substrate electrically connected to the positive foils of the capacitor unit and a negative guiding substrate electrically connected to the negative foils of the capacitor unit; and
   a package unit covering the capacitor units and one part of the substrate unit.

2. The lamellar stacked solid electrolytic capacitor according to claim 1, wherein each positive foil has a resin body selectively installed on an edge thereof, and each negative foil has a resin body selectively installed on an edge thereof.

3. The lamellar stacked solid electrolytic capacitor according to claim 1, wherein each capacitor unit has a plurality of insulating layers, and each insulating layer is disposed around one part of an external surface of each positive foil in order to limit the lengths of the negative foils and the isolation paper.

4. The lamellar stacked solid electrolytic capacitor according to claim 1, wherein the positive foil of the capacitor unit has a positive pin extended outwards therefrom, the positive pins of the capacitor units are divided into a plurality of positive pin units that are separated from each other, and the positive pins of each positive pin unit are electrically stacked onto each other, wherein the negative foil of the capacitor unit has a negative pin extended outwards therefrom, the negative pins of the capacitor units are divided into a plurality of negative pin units, the negative pin units are separated from each other, and the negative pins of each negative pin unit are electrically stacked onto each other, wherein the positive pins are selectively respectively extended outwards from the positive foils along the same direction or different directions, and the negative pins are selectively respectively extended outwards from the negative foils along the same direction or different directions.

5. The lamellar stacked solid electrolytic capacitor according to claim 1, wherein the positive foil of the capacitor unit has a positive pin extended outwards therefrom, the positive pins of the capacitor units are divided into a plurality of positive pin units that are separated from each other, and the positive pins of each positive pin unit are electrically stacked onto each other, wherein the negative foil of the capacitor unit has a negative pin extended outwards therefrom, the negative pins of the capacitor units are combined to form a negative pin unit, and the negative pins are electrically stacked onto each other, wherein the positive pins are selectively respectively extended outwards from the positive foils along the same direction or different directions, and the negative pins are respectively extended outwards from the negative foils along the same direction.

6. The lamellar stacked solid electrolytic capacitor according to claim 1, wherein the positive foil of the capacitor unit has a positive pin extended outwards therefrom, the positive pins of the capacitor units are combined to form a positive pin unit, and the positive pins are electrically stacked onto each other, wherein the negative foil of the capacitor unit has a negative pin extended outwards therefrom, the negative pins of the capacitor units are divided into a plurality of negative pin units that are separated from each other, and the negative pins of each negative pin unit are electrically stacked onto each other, wherein the positive pins are respectively extended outwards from the positive foils along the same direction, and the negative pins are selectively respectively extended outwards from the negative foils along the same direction or different directions.

7. A lamellar stacked solid electrolytic capacitor, comprising:
   a capacitor unit composed of a plurality of negative foils, a plurality of isolation paper with conductive polymer substance and a plurality of positive foils that are alternatively stacked onto each other, wherein each isolation paper is disposed between each positive foil and each negative foil, the positive foils are electrically connected to each other, the negative foils are electrically connected to each other, and the positive foils and the negative foils are insulated from each other, wherein each capacitor unit has a plurality of insulating layers, each insulating layer is disposed around one part of an external surface of each positive foil in order to limit the lengths of the negative foils and the isolation paper;
   a substrate unit having a positive guiding substrate electrically connected to the positive foils of the capacitor unit and a negative guiding substrate electrically connected to the negative foils of the capacitor unit; and
   a package unit covering the capacitor units and one part of the substrate unit.

8. The lamellar stacked solid electrolytic capacitor according to claim 7, wherein each positive foil has a resin body selectively installed on an edge thereof, and each negative foil has a resin body selectively installed on an edge thereof.

9. The lamellar stacked solid electrolytic capacitor according to claim 7, further comprising: a conductive layer electrically connected to one end of each negative foil, and the length of the end of each negative foil is larger than the length of one end of each positive foil in order to prevent the positive foils touching the conductive layer.

10. The lamellar stacked solid electrolytic capacitor according to claim 7, wherein the positive foil of the capacitor unit has a positive pin extended outwards therefrom, the positive pins of the capacitor units are divided into a plurality of positive pin units that are separated from each other, and the positive pins of each positive pin unit are electrically stacked onto each other, wherein the negative foil of the capacitor unit has a negative pin extended outwards therefrom, the negative pins of the capacitor units are divided into a plurality of negative pin units, the negative pin units are separated from each other, and the negative pins of each negative pin unit are electrically stacked onto each other, wherein the positive pins are selectively respectively extended outwards from the positive foils along the same direction or different directions, and the negative pins are selectively respectively extended outwards from the negative foils along the same direction or different directions.

11. The lamellar stacked solid electrolytic capacitor according to claim 7, wherein the positive foil of the capacitor unit has a positive pin extended outwards therefrom, the positive pins of the capacitor units are divided into a plurality of positive pin units that are separated from each other, and the positive pins of each positive pin unit are electrically stacked onto each other, wherein the negative foil of the capacitor unit has a negative pin extended outwards therefrom, the negative pins of the capacitor units are combined to form a negative pin unit, and the negative pins are electrically stacked onto each other, wherein the positive pins are selectively respectively extended outwards from the positive foils along the same direction or different directions, and the negative pins are respectively extended outwards from the negative foils along the same direction.

12. The lamellar stacked solid electrolytic capacitor according to claim 7, wherein the positive foil of the capacitor unit has a positive pin extended outwards therefrom, the positive pins of the capacitor units are combined to form a positive pin unit, and the positive pins are electrically stacked onto each other, wherein the negative foil of the capacitor unit has a negative pin extended outwards therefrom, the negative pins of the capacitor units are divided into a plurality of negative pin units that are separated from each other, and the negative pins of each negative pin unit are electrically stacked onto each other, wherein the positive pins are respectively extended outwards from the positive foils along the same direction, and the negative pins are selectively respectively extended outwards from the negative foils along the same direction or different directions.

* * * * *